United States Patent [19]
Papa et al.

[11] 3,773,696
[45] Nov. 20, 1973

[54] TETRABROMO ETHER DIOL AS A FLAME-RETARDANT FOR POLYURETHANE FOAMS

[75] Inventors: Anthony Joseph Papa, Saint Albans, W. Va.; William Robert Proops, Claymont, Del.; Theodore Curtis Shields, Charleston, W. Va.

[73] Assignee: Union Carbide Corporation, New York, N.Y.

[22] Filed: Aug. 16, 1971

[21] Appl. No.: 172,301

[52] U.S. Cl... 260/2.5 AJ, 260/2.5 AP, 260/2.5 FP, 260/45.95 L, 260/77.5 SS
[51] Int. Cl............................................. C08c 17/08
[58] Field of Search.................. 260/2.5 AT, 2.5 FP, 260/77.5 SS, 45.95 L

[56] References Cited
UNITED STATES PATENTS

| | | | |
|---|---|---|---|
| 3,252,922 | 5/1966 | Degener et al. | 260/2.5 |
| 2,990,379 | 6/1961 | Young et al. | 260/2.5 |
| 3,639,543 | 2/1972 | Newton et al. | 260/2.5 X |
| 3,009,888 | 11/1961 | Mueller-Tamm et al. | 260/2.5 |
| 3,465,031 | 9/1969 | Stephenson et al. | 260/2.5 X |

FOREIGN PATENTS OR APPLICATIONS

| | | |
|---|---|---|
| 889,720 | 2/1962 | Great Britain |
| 895,966 | 5/1962 | Great Britain |
| 1,063,605 | 3/1967 | Great Britain |

*Primary Examiner*—Donald E. Czaja
*Assistant Examiner*—G. Marshall
*Attorney*—Paul A. Rose et al.

[57] ABSTRACT

This invention is directed to the new compound, 2,3-dihydroxyprop-1-yl 2,3,7,8-tetrabromooct-1-yl ether, and to flame-retarded polymeric compositions having said compound incorporated therein. The tetrabromooctyl ether diol is employed with particular advantage in the formation of flame-retarded cellular polyurethanes including self-extinguishing flexible foams.

5 Claims, No Drawings

TETRABROMO ETHER DIOL AS A FLAME-RETARDANT FOR POLYURETHANE FOAMS

The present invention relates to a particular tetrabrominated aliphatic polyol, its use as a flame-retardant, and to polymer compositions, including polyurethanes, having said compound incorporated therein.

It is known that polyurethane polymers are manufactured by the reaction of polyfunctional isocyanates and polyfunctional active hydrogen-containing compounds such as in particular polyethers and polyesters containing free hydroxyl groups, and that cellular products are provided by effecting the reaction in the presence of a blowing agent. Notwithstanding their many useful properties which have contributed to their acceptance for many end-use applications in the transportation, building, household and textile industries, it is recognized that an objectionable characteristic of polyurethanes, particularly when in cellular form, is their risk of flammability in applications where exposure to high temperatures and/or an open flame may be encountered. This problem which also exists with respect to other synthetic organic polymers such as, for example, thermosetting polyesters, polyepoxides and polystyrene, has of course received considerable attention with the result that a variety of compounds which are largely phosphorus-containing compounds and halogen-substituted compounds, are reported in the literature as effective agents for reducing flammability.

An important criterion in determining the efficacy of any particular flame-retarding agent is its ability to improve flame resistance with minimum impairment of desirable physical and mechanical properties of the polymer. As between various types of polymers including resinous coating compositions and cellular materials ranging from the open cell flexible foams to the closed and more highly cross-linked rigid foams, the flexible cellular polymers are inherently more difficult to flameproof without substantially upsetting the delicate balance of foam properties and open cell nature. For example, in British Pat. specification No. 1,063,605, it is reported that polyurethane coating compositions of improved fire-retardant properties are provided by the incorporation therein of 3-bromo-2,2-bis(bromomethyl)propanol, 2,2-bis(bromomethyl)-1,3-propanediol, or a mixture thereof. The brominated diol which is also referred to in the art as dibromoneopentyl glycol, has the structural formula,

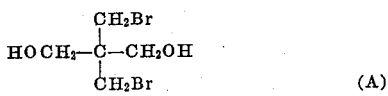

(A)

and is designated herein as Compound A. Although the aforesaid patent is not concerned with flame-retarding polyurethane foams, Compound A was tested to determine its efficacy as a flame-retardant of flexible polyether polyurethane foam. These tests revealed that, although Compound A provided self-extinguishing foams, this result is accompanied by both a substantial lowering of foam breathability (related to open cell character) and a substantial increase in compression set. A further drawback of Compound A is that it is a solid material (melting point 109°–110°C.) and does not, therefore, offer the processing advantages of normally liquid flame-retarding agents.

A further factor which magnifies the difficulty of providing satisfactory flame-retarded flexible foams is that such foams generally exhibit a greater tendency to ignite at temperatures lower than the combustion temperatures of rigid foams. Thus, a particular compound which may be effective in reducing the flammability of rigid foams, may be too stable at lower temperatures to be an efficient flame-retardant of flexible cellular materials.

A further problem especially associated with the formation of flame-retarded polyurethanes generally, is the tendency of many flame-retardants to cause foam scorching. This undesirable result is most commonly associated with halogen-substituted organic flame-retardants and is often attributed to the release of hydrogen halide. Thus, although stability toward elimination of hydrogen halide appears necessary to minimize scorch, too high a degree of thermal stability will lower flame-retarding effectiveness.

Among other brominated aliphatic hydroxyl-substituted compounds reported in the literature as flame-retarding agents for polyurethanes is 2,3-dibromopropanol which, in accordance with British Pat. specification No. 895,966 and 889,720, respectively, is used either as such or in combination with antimony oxide. Although this compound which has the formula, $BrCH_2CHBrCH_2OH$, is capable of providing self-extinguishing flexible polyurethane foams, it is found that the products are discolored due to scorching. This latter result is not surprising in view of the recognized relatively high reactivity of bromine bonded to the carbon atom beta to oxygen of the dibromoallyloxy grouping, $—CHBr—CHBr—CH_2—O—$. The dibromoallyloxy group is also present as the sole dibrominated site of the ether alcohols of U.S. Pat. No. 3,252,922, such as 2,3-dibromobutanediol-1,4-mono-2-hydroxyethyl ether which has the formula, $HOCH_2CHBrCHBrCH_2—O—CH_2CH_2OH$. Although the latter patent indicates that such compounds provide difficultly combustible elastic foams, as previously noted the ability to impart flame-retardant properties is only one of a number of criteria to be considered in determining the overall effectiveness of any particular flame-retarding agent.

It is desirable, therefore, and is a primary object of this invention to provide a novel bromine-substituted aliphatic polyol which finds particular application in the formation of flame-retarded, substantially scorch-free, cellular polyurethanes of good overall physical and mechanical properties and which offers the further advantage of being a normally liquid material compatible with various components employed in the production of polyurethanes.

Various other objects and advantages of the present invention will become apparent to those skilled in the art from the accompanying description and disclosure.

The present invention provides the particular tetrabrominated aliphatic ether diol, 2,3-dihydroxyprop-1-yl 2,3,7,8-tetrabromooct-1-yl ether, which is a new compound and has the formula:

This compound, which for convenience is also referred to herein as Compound I, is prepared by the bromination of 2,3-dihydroxyprop-1-yl 2,7-octadien-1-yl ether. The present invention also provides flame-retarded polymer compositions such as in particular urethane polymers and other polymers that are normally susceptible to burning, having Compound I incorporated therein. In accordance with one aspect of this embodiment of the present invention, flame-retarded polyurethanes are provided by reacting a reaction mixture containing: (1) an organic polyisocyanate, (2) an organic compound containing an average of at least two active hydrogen atoms capable of reacting with isocyanato groups such as, in particular, polyether polyols and polyester polyols, and (3) the aforesaid dihydroxypropyl tetrabromooctyl ether of the present invention. The polyurethane-forming reaction is usually effected in the presence of a catalyst comprising an amine as an additional component of the reaction mixture. The flame-retarded polyurethanes of the present invention may be produced as flexible, semi-flexible and rigid foams (i.e., cellular polyurethanes), flexible and stiff fibers, coatings, films, elastomers and the like. In producing flame-retarded cellular polyurethanes, the aforesaid reaction of (1), (2) and (3) is carried out in the presence of a blowing or foaming agent as an additional component of the reaction mixture.

The novel tetrabromooctyl ether diol of this invention possesses a particularly desirable combination of properties as a flame-retardant of cellular polyurethanes, especially flexible foams. For example, in addition to being a normally liquid material, it is compatible with components normally present in polyurethane-forming reaction mixtures such as, for example, polyether polyols. It is, therefore, readily amenable to use in the widely employed "one-shot" or single stage technique for producing flexible polyurethane foams. It is also found that the flame-retarding agent of this invention allows for the formation of flexible polyurethane foams which are self-extinguishing, substantially scorch-free and of overall good quality. A particularly noteworthy property of Compound I is that it imparts flame-retardant including self-extinguishing characteristics to flexible polyurethane foams without causing any substantial impairment of the desirably low compression set of flexible foams.

The novel flame-retardant of this invention is prepared as the bromination reaction product of 2,3-dihydroxyprop-1-yl 2,7-octadien-1-yl ether, as shown by the following equation (1):

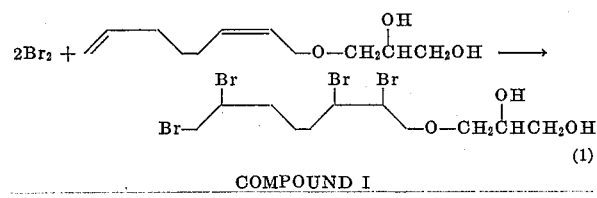

COMPOUND I

This addition reaction is usually carried out at relatively low temperatures such as from about minus 15°C. to about plus 10°C. and proceeds rapidly at substantially atmospheric pressure. The reaction is preferably conducted in the substantial absence of light using about 2 mols of bromine per mol of the octadienyl ether diol reactant. The bromination reaction may be carried out in the presence or absence of a diluent or solvent. When used, suitable diluents include the halogen-substituted lower alkanes such as carbon tetrachloride, chloroform and methylene chloride, although other diluents which are liquid and substantially non reactive under the aforesaid conditions may be employed, such as trichloromono-fluoromethane, 1,1,2-trichloro-1,2,2-trifluoroethane, benzene and the like. After the reaction, which may be carried out batchwise or in a continuous manner, the product is recovered by conventional techniques such as extraction or as the product remaining after removal of more volatile components. When the product of the reaction of equation (1) has an acid number greater than about 1.0 mg. KOH/gram and is to be used as the flame-retardant component of polyurethane-forming reaction mixtures containing an amine catalyst, it is preferred practice to subject the product to further purification to reduce the acid number to less than about 1.0, and most preferably to less than about 0.50 mg. KOH/gram. This is readily accomplished by treating the product with any relatively weak alkaline material such as sodium bicarbonate.

In addition to polyurethanes, Compound 1 can also be used to impart flame-retardancy to other solid synthetic organic polymers which are normally susceptible to burning. Among such additional polymers are: condensation polymers such as thermosetting polyesters, polyepoxides, and thermoplastic polyesters; and addition polymers derived from ethylenically unsaturated monomers such as ethylene, propylene, styrene, alkyl-substituted styrenes, lower alkyl acrylates and methacrylates, vinyl acetate, and other resinous polymers well known to the art.

The amount of Compound I which is incorporated into any particular polymer composition depends on several factors including the degree of flame-retardancy desired, whether an additional flame-retardant is employed, the chemical composition of the polymeric material, the physical nature (i.e., cellular or non cellular), and, with respect to cellular polymers, the nature of the cellular structure (i.e., flexible, semi-flexible or rigid). Generally, Compound I is employed in an amount sufficient to provide in the polymer product, bromine in an amount from about 0.5 to about 20 weight percent. In providing flame-retarded cellular polyurethanes including flexible polyurethane foams, Compound I is used in an amount sufficient to incorporate in the polymer at least about 1 and usually no more than about 10 weight percent bromine, based on the combined weight of the polyisocyanate, active hydrogen-containing reactant and Compound I. In producing self-extinguishing, flexible polyurethane foams it is usually preferred to employ Compound I in an amount sufficient to provide a bromine content of at least about 1.5, and most preferably at least about 2, weight percent, expressed on the aforesaid basis.

The polyisocyanates used in the manufacture of polyurethanes are known to the art and any such reactants are suitably employed in producing the flame-retarded compositions of this invention. Among the suitable polyisocyanates are those represented by the general formula:

wherein $i$ has an average value of at least two and Q is an aliphatic, cycloaliphatic or aromatic radical which can be an unsubstitued hydrocarbyl group or a hydrocarbyl group substituted for example, with halogen or alkoxy. For example, Q can be an alkylene, cylcoalkylene, arylene, alkyl-substituted cycloalkylene, alkarylene or aralkylene radical including corresponding halogen-substituted radicals. Typical examples of suitable polyisocyanates for use in preparing the flame-retarded polyurethanes of this invention are: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,3-phenylenediisocyanate, 4-chloro-1,3-phenylenediisocyanate, 4-bromo-1,3-phenylenediisocyanate, 5,6-dimethyl-1,3-phenylenediisocyanate, 2,4- and 2,6-tolylene diisocyanates, crude tolylene diisocyanate, 6-isopropyl-1,3-phenylenediisocyanate, durylene diisocyanate and triphenylmethane-4,4',4''-triisocyanate. Other suitable polyisocyanate reactants are ethylphosphonic diisocyanate and phenylphosphonic diisocyanate. Also useful are the polyisocyanates of the aniline-formaldehyde polyaromatic type which are produced by phosgenation of the polyamine obtained by acid-catalyzed condensation of aniline with formaldehyde. Polyphenylmethylene polyisocyanates of this type are available commercially under such trade names as PAPI, AFPI, Mondur MR, Isonate 390P, NCO-120, NCO-10 and NCO-20. These products are low viscosity (50-500 centipoises at 25°C.) liquids having average isocyanato functionalities in the range of about 2.25 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates; and a mixture of isomeric tolylene diisocyanates with polymeric tolylene diisocyanates obtained as residues from the manufacture of the diisocyanates.

The amount of polyisocyanate employed varies slightly depending upon the nature of the polyurethane being prepared. In general, the polyisocyanates are employed in amounts that provide from 80 to 150 percent, preferably from 90 to 120 percent of the stoichiometric amount of the isocyanato groups required to react with all of the hydroxyl groups present in the other reactants of the polyurethane producing reaction mixture, including the hydroxyl groups of the tetrabromooctyl ether diol of this invention, the additional polyol reactants described below and any water which may be present as a source of blowing action.

In producing the flame-retarded urethane polymers of the present invention, one or more polyols in addition to the tetrabromooctyl ether diol of the present invention is employed in the reaction with the organic polyisocyanate. Such additional active hydrogen-containing compounds have an average of at least two hydroxyl groups per molecule and include compounds which consist of carbon, hydrogen and oxygen and compounds which also contain phosphorus and/or halogen. Suitable classes of such active hydrogen-containing compounds are polyether polyols, polyester polyols, lactone polyols and phosphorus-containing polyols.

Among the suitable polyether polyols that can be employed are the alkylene oxide adducts of water or any of the following polyhydroxyl-containing organic compounds: ethylene glycol; diethylene glycol; propylene glycol; dipropylene glycol; trimethylene glycol; butylene glycols; glycerol; 1,2,6-hexanetriol; 1,1,1-trimethyolethane; 1,1,1-trimethyolpropane; 3-(2-hydroxyethoxy)-1,2-propanediol; pentaerythritol; 1,2-cyclohexanediol; sorbitol; sucrose; lactose; glycosides such as alpha-methylglucoside and alpha-hydroxyalkyl glucoside, fructoside and the like; compounds in which hydroxyl groups are bonded to an aromatic nucleus such as resorcinol, pyrogallol, phloroglucinol, di-, tri-, and tetra-phenylol compounds such as bis-(p-hydroxyphenyl)-methane and 2,2-bis-(p-hydroxyphenyl)-propane, and many other such polyhydroxyl compounds known to the art. The alkylene oxides employed in producing polyether polyols, which are also known as poly(oxyalkylene) polyols, usually have from 2 to 4 carbon atoms and are preferably ethylene oxide, propylene oxide and any combination thereof. In the preparation of mixed poly(oxyethylene-oxypropylene) polyols, the ethylene and propylene oxides may be added to the hydroxyl-containing reactant either in admixture or sequentially.

Suitable polyester polyols for use in the manufacture of polyurethanes are the reaction products of: (1) one or more of the aforesaid polyether polyols or the polyhydroxyl-containing organic compounds which are reacted with alkylene oxide to produce such polyether polyols, and (2) a polyfunctional organic carboxylic acid including aliphatic and aromatic acids. Typical examples of suitable polycarboxylic acids that can be employed in producing polyester polyols are: succinic, adipic, sebacic, azelaic, glutaric, pimelic, malonic and suberic acids; and aromatic acids such as phthalic, terephthalic and isophthalic acids and the like.

Other suitable polyols for use in the manufacture of the flame-retarded polyurethanes of this invention are: lactone-based polyols prepared by reacting a lactone such as epsilon-caprolactone or a mixture of epsilon-caprolactone and an alkylene oxide with a polyfunctional initiator such as a polyhydric alcohol, an amine, or an aminoalcohol; and phosphorus-containing polyols such as the alkylene oxide adducts of phosphoric acid, polyphosphoric acids such as tri- and tetra-phosphoric acids, organo-substituted phosphoric acids such as benzenephosphoric acid and the like.

The particular polyol reactant or combination of polyols employed depends upon the end-use of the polyurethane product which in turn determines whether the product is to be provided as a flexible or rigid material. For this purpose, the polyol reactant is usually characterized by its hydroxyl number which is defined as the number of milligrams of potassium hydroxide required for the complete neutralization of the hydrolysis product of the fully acetylated derivative prepared from 1 gram of polyol or mixture of polyols. The hydroxyl number can also be defined by the equation:

$$OH = (56.1 \times 1{,}000 \times f)/M.W.$$

wherein

OH = hydroxyl number of the polyol
$f$ = average functionality, that is, average number of hydroxyl groups per molecule of polyol
M.W. = average molecular weight of the polyol In producing rigid polyurethanes, the polyol preferably possesses a hydroxyl number from about 200 to about 1,000. In producing semi-flexible materials, the hydroxyl number is usually from about 100 to about 250. Lower hydroxyl numbers from about 32 to about 150 are usually appropriate for the polyols employed in producing flexible polyurethanes. These ranges of hydroxyl numbers are not intended to be restrictive but are merely presented as illustrative of the relatively large number of possible polyols and combinations thereof that can be employed.

The urethane-forming reaction is usually carried out in the presence of a minor amount of a catalyst comprising an amine. Suitable amine catalysts include one or more of the following: N-methylmorpholine; N-ethylmorpholine; N-octadecylmorpholine; triethylamine; tributylamine; trioctylamine; N,N,N'N'-tetramethylethylenediamine; N,N,N',N'-tetramethyl-1,3-butanediamine; triethanolamine; N,N-dimethylethanolamine; triisopropanolamine; N-methyldiethanolamine; bis(2-dimethylaminoethyl)ether; hexadecyldimethylamine; N,N-dimethylbenzylamine; trimethylamine; triethylenediamine (i.e., 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. The amine catalyst may be introduced to the polyurethane-producing reaction mixture as such or as a solution in suitable carrier solvents such as diethylene glycol; dipropylene glycol; and 2-methyl-2,4-pentanediol ("hexylene glycol").

The amine catalyst is present in the final urethane-producing reaction mixture in an amount of from about 0.05 to about 3 parts by weight of active catalyst (that is, the amine exclusive of other components present in solutions thereof) per 100 parts by weight of polyol reactant.

In producing polyurethanes from polyether polyols it is often desirable to include as a further component of the reaction mixture a minor amount of certain metal catalysts. Such supplementary catalysts are well known to the urethane art. For example, useful metal catalysts include organotin compounds, particularly tin compounds of carboxylic acids such as stannous octoate, stannous oleate, stannous acetate, stannous laurate, dibutyltin dilaurate, and other such tin salts. Additional metal catalysts are organo-compounds of other polyvalent metals such as zinc and nickel (e.g., nickel acetylacetonate), or other such metal catalysts which are well known in the art of flexible polyether urethane foam manufacture. The amount of each such metal catalyst which can be present in the polyurethane-producing reaction mixture is from about 0.05 to about 2 parts by weight per 100 parts by weight of the polyether polyol starting material.

When it is desired to provide cellular polyurethanes, the reaction mixture also includes a minor amount of a foaming or blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80°F. and above minus 60°F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Illustrative of the fluorocarbon blowing agents are trichloromonofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. When producing flexible foams, the generally preferred method of foaming is the use of water or a combination of water plus a fluorocarbon blowing agent such as trichloromonofluoromethane. On the other hand, in producing rigid foams the blowing agent is usually one of the aforesaid halogenated compounds.

The amount of blowing agent employed in the foaming reaction will vary with factors such as the density that is desired in the foamed product. Usually, however, from about 1 to about 30 parts by weight of the blowing agent per 100 parts by weight of polyol is employed.

In producing flame-retarded cellular polyurethanes in accordance with the method of this invention, a minor amount of a foam stabilizer is also usually present as an additional component of the reaction mixture. When used, the foam stabilizer is usually a poly(siloxane-oxyalkylene) block copolymer and may be any of such copolymers described in the art. Generally, the block copolymers comprise: (1) siloxy units having the formula, $Z_2SiO$, (2) polyether-substituted siloxy units having the general formula, $Z°O(C_nH_{2n}O)_xC_mH_{2-m}Si(Z)O$, and (3) siloxy units having the formula, $Z_3SiO_{1/2}$, where: Z in each instance is a monovalent hydrocarbon group having from 1 to 12 carbon atoms such as alkyl and aryl groups, in particular methyl; Z° is either Z, Z—C(O) or hydrogen, wherein Z is as aforesaid; —$C_mH_{2m}$— is a bivalent hydrocarbon radical, usually of 2 to 5 carbon atoms, that links the respective silicon atoms of the polyether-substituted siloxy units to the polyether block, $Z°O(C_nH_{2n}O)_x$, in which $n$ has a value of from 2 to 4 and the average value of $x$ is such that the average molecular weight of the polyether block is from about 200 to about 6,000. Illustrative block copolymers for use as foam stabilizers in the foaming reaction of this invention are, for example, the copolymers described in U.S. Pat. Nos. 2,834,748; 2,917,480; 3,505,377; 3,507,815; 3,563,924; and in the U.S. Pat. application Ser. No. 109,587, filed Jan. 25, 1971 now abandoned. Such copolymer compositions are incorporated herein by reference to the aforesaid patents and application. When used, the foam stabilizer is present in the polyurethane-forming reaction mixture in an amount within the range of from about 0.2 to about 5 parts by weight or more, per 100 parts by weight of the polyol reactant.

The flame-retarded urethane polymers of the invention can take the form of foamed products, elastomers, surface coatings, castings and the like, and may be formed in accordance with any of the processing techniques known to the polyurethane art such as the "one-shot," quasi-prepolymer and prepolymer techniques. For example, in accordance with the "one-shot" process, foamed products are produced by carrying out the reaction of the polyisocyanate, polyol and Compound I simultaneously with the foaming operation. In preparing the foamed products in accordance with the quasi-prepolymer technique, the polyisocyanate is first reacted with a portion of the polyol to give a product having a high percentage of free-NCO groups (e.g., from 20 to 50 percent), and the product is subsequently foamed by reaction with additional polyol and foaming agent. In the prepolymer technique, the isocyanate is reacted with a slightly less than stoichiometric quantity of polyol to form a prepolymer having a low percentage (e.g., from 1 to 10 percent) of free-NCO groups, followed by reaction of the prepolymer with a blowing agent such as water to form the cellular material. In these various multistage methods, Compound I may be incorporated at any stage but is usually used in combination with the polyol reactant. Elastomers and castings are formed by reaction of the aforesaid prepolymer with a cross-linking agent having reactive hydrogens such as a diamine as typically exemplified by a bis-(aminochlorophenyl)methane. Curing of the prepolymer by atmospheric moisture provides surface coatings.

The flame-retarded polyurethanes produced in accordance with the present invention are used in the same areas as conventional polyurethanes and are especially useful where fire-resistance properties are required. Thus the polymers are useful as textile interliners, cushions, mattresses, paddings, packaging, gaskets, sealers, thermal insulators and the like.

The following examples are merely illustrative of the present invention and are not intended as a limitation upon the scope thereof.

The following Examples I and II illustrate the preparation of the flame-retardant of this invention by the bromination of 2,3-dihydroxyprop-1-yl 2,7-octadien-1-yl ether. Preparation of this latter starting material is typically illustrated as follows:

To a 3 pint Chemco glass pressure reactor, there were charged 300 grams of glycerol, 60 grams of butadiene, 300 grams of t-butanol, 1.8 grams of palladium acetylacetonate and 1.56 grams of triphenylphosphine. The mixture was heated to 80°C. and held there for about 45 minutes to yield 654 grams of liquid product. This procedure was repeated twice to give a total of 1,981 grams of reaction product. This material was diluted with 3-4 liters of water and extracted several times with ethyl ether. The organic extracts were combined and the solvent removed under vacuum. The higher boiling material was passed through a Rodney-Hunt molecular still at 210°-220°C. and 0.5 mm. pressure. The overhead product was redistilled to yield 2,3-dihyroxyprop-1-yl 2,7-octadiene-1-yl ether having a boiling point of 142°-143°C. at a reduced pressure of 0.4 mm. The structure of the product was confirmed by infrared and nuclear magnetic resonance spectroscopy. Upon analysis, the product was found to contain (on a weight per cent basis): C, 65.76; H, 10.04 (calcd. for $C_{11}H_{20}O_3$: C, 65.97; H, 10.07).

EXAMPLE I

Preparation of 2,3-Dihydroxypropyl 2,3,7,8-Tetrabromooctyl Ether

To 108 grams (0.54 mol) of 2,3-dihydroxyprop-1-yl 2,7-octadien-1-yl ether in 100 ml. of carbon tetrachloride at 0°C., there was added a solution of 172.5 grams (1.08 mol) of bromine in 100 ml. of carbon tetrachloride while maintaining the temperature at minus 4° to 0°C. The reaction was protected from light by means of aluminum foil and was carried out under nitrogen as an inert atmosphere. When one-half of the bromine solution had been added, another 100 ml. of carbon tetrachloride was added to the reaction mixture to lower the viscosity. The addition took 4.5 hours. When the addition was complete, the reaction mixture was allowed to warm up to ambient temperature on standing overnight. The resultant two phase, light orange, liquid product mixture was then subjected to reduced pressure (6.0 mm) at 50°C. for 1 hour to remove volatile components. No evidence of HBr by a moist litmus test was noted at this point. The product had the following properties:

Brookfield Viscosity (25°C.), centipoises — 126,600
Hydroxyl Number, mg. KOH/gram — 185.15
Acid Number, mg. KOH/gram — 16.45

The product was subjected to analysis and found to contain 58.71 weight per cent bromine. The calculated Br content on the basis of $C_{11}H_{20}Br_4O_3$ is 61.5 weight percent.

To lower the acid content, the product was taken up in chloroform and the chloroform solution washed with three 100-ml. portions of saturated sodium bicarbonate solution, and then with four 100-ml. portions of distilled water. After drying over anhydrous magnesium sulfate, the chloroform was removed under reduced pressure (3 mm.) at 50°C., thereby providing 2,3-dihydroxyprop-1-yl 2,3,7,8-tetrabromooct-1-yl ether as a yellow liquid having an acid number of 0.412 mg KOH/gram.

EXAMPLE II

Preparation of 2,3-Dihydroxpropyl 2,3,7,8-Tetrabromooctyl Ether

The reaction of this example was carried out under nitrogen in a 5-liter capacity, stirred reaction vessel which was shielded from light and cooled in a Dry Ice-acetone bath. To 338 grams (1.69 mols) of 2,3-dihydroxyprop-1-yl 2,7-octadien-1-yl ether in 1000 ml. of carbon tetrachloride at about minus 2°C., there was added 538 grams (3.38 mols) of bromine diluted with 500 ml. of carbon tetrachloride. The reaction mixture was maintained at a temperature of −2°C. to −6°C. throughout the bromine addition which took about 4 hours. At the end of this period, the reaction mixture thickened and was diluted with an additional 1,000 ml. of carbon tetrachloride after which the mixture was stirred and allowed to warm to room temperature overnight. The two-phase reaction mixture was washed with four 500-ml. portions of a saturated (about 10 weight percent) sodium bicarbonate solution followed by washing with water. The washed mixture was dried over magnesium sulfate, filtered, and volatile components were removed therefrom at 50°C. and 5 mm. pressure in a rotary evaporator. The viscous liquid product had the following characteristics:

Brookfield Viscosity (25°C.), centipoises —51,000
Hydroxyl Number, mg. KOH/gram —189.8
Acid Number, mg. KOH/gram — 0.109
Br Analysis (weight per cent) — 61.06

EXAMPLES III–VIII

In accordance with these examples, flame-retarded flexible polyurethane foams were prepared by reacting and foaming a reaction mixture containing a polyether polyol, a polyisocyanate, water as the source of blowing action, an amine catalyst, stannous octoate, a silicone surfactant as the foam stabilizer and, as the flame-retardant, 2,3-dihydroxyprop-1-yl 2,3,7,8-tetrabromooctyl ether of the present invention prepared in accordance with Example I. Flexible polyether foams were also prepared in which either: (1) no flame-retardant was added (designated Run No. K), or (2) the known compound, dibromoneopentyl glycol, discussed and designated hereinabove as Compound A, was incorporated (designated Run Nos. C-1 and C-2).

In each of Examples III-VIII and Runs K, C-1 and C-2, the foam formulation contained the components identified in the following Table I wherein the relative proportions are expressed on the standardized basis of 100 parts by weight of polyether polyol, although the foams where produced on five times the scale.

TABLE I

FOAM FORMULATION A

| Component | Parts by Weight |
| --- | --- |
| Polyether Polyol having a hydroxyl number of 56 produced by reacting glycerol and propylene oxide | 100 |
| Tolylene Diisocyanate (Index 105) /1/ | Varied /3/ to obtain Index 105 |
| Water | 4 |
| Bis-[2-(N,N-dimethylamino)ethyl]ether employed as a 70 weight per cent solution in dipropylene glycol | 0.1 |
| Stannous Octoate | Varied /3/ |
| Silicone Surfactant /2/ | 0.5 |
| Flame-Retardant | Varied /3/ |

/1/ This component was a mixture of the 2,4- and 2,6-isomers of tolylene diisocyanate present in a weight ratio of 80:20, respectively. Index 105 designates that the amount of mixture employed was 105 weight per cent of the stoichiometric amount required to react with total reactive hydrogens from the polyether polyol, diol flame-retardant and water present in the foam formulation.

/2/ A polysiloxane-polyoxyalkylene block copolymer having the average formula:

$$MeO(C_3H_6O)_{29}(C_2H_4O)_{20}(CH_2)_3\text{—}$$
$$Me_3SiO(Me_2SiO)_{72}(MeSiO)_{5.1}SiMe_3$$

(wherein "Me" represents a methyl group) employed as an approximately 55 weight per cent solution in a solvent medium containing about 90 and 10 weight per cent, respectively, of compounds having the average formulas, $C_4H_9(OC_2H_4)_{19}(OC_3H_6)_{14}OH$ and $C_9H_{19}C_6H_4(OC_2H_4)_{10.5}OH$.

/3/ For specific proportions employed, refer to Table II herein.

The respective foams of Examples III-VIII were prepared using the following procedure:

The diisocyanate, silicone surfactant, polyether polyol and 2,3-dihydroxypropyl tetrabromooctyl ether were each weighed into and added as separate streams to a ½-gallon container fitted with a baffle. The resultant mixture was stirred for 60 seconds with a high speed stirrer at 2,700 rpm. After the mixture was allowed to stand for 15 seconds, it was stirred for an additional 15 seconds. During the latter period but after 5 seconds had elapsed, the amine catalyst and water were added as a premixed solution and, after the remaining 10-second period of stirring, the stannous octoate was added from a syringe. When the 15 seconds of stirring was completed, the mixture was quickly poured into a mold (14 × 14 × 6 inches) whereupon the respective masses foamed. Both the cream time and rise time were recorded which terms denote the interval of time from the formation of the complete foam formulation to (1) the appearance of a creamy color in the formulation and (2) the attainment of the maximum height of the foam, respectively. The foams were allowed to stand at ambient conditions for 2 days before flammability, physical and mechanical properties were determined. The specific relative proportions of those compnents of Foam Formulation A which were varied and the foam properties are given in Table II.

The above procedure was also followed in providing the control foam of Run No. K except, of course, that no flame-retardant was added.

In providing the foams of comparative Run Nos. C-1 and C-2, the above procedure was also followed except that, in view of its solid nature, Compound A (dibromoneopentyl glycol) was added as a preformed solution in the liquid polyether polyol. The latter solution was prepared by: (1) combining Compound A and polyol in an amount sufficient to provide an 18 weight percent solution of Compound A in the polyether polyol; (2) heating the resulting suspension at about 70°C. for 1.5 hours to completely solubilize Compound A; and (3) blending the resulting solution in a predetermined amount with additional polyol to provide the relative proportion of Compound A per 100 parts by weight of polyol indicated in Table II.

Flammability properties, determined before and after accelerated aging, were measured in accordance with standard test procedure ASTM D 1692–67 T, except that five samples of each foam were tested. The results are given in Table II below wherein:

"SE" indicates that on the basis of the results obtained in the aforesaid flammability test, the foam is rated as self-extinguishing.

"Burning Extent" denotes the burned length of the foam specimen; the flammability of the foam is proportional to the burning extent as measured by the aforesaid test.

"Extinguishing Time" denotes the time taken to give the specified "burning extent."

"Dry Heat Aging" indicates that the foam specimen was heated in an oven at 140°C. for 22 hours, as specified in test method ASTM D 156–64 T, Sections 38–44.

"Humid Aging" indicates that the foam specimen was subjected to heating at 120°C. for 5 hours in a steam autoclave, as specified in test method ASTM D 1564–64 T, Section 5.1.2.

In addition to flammability properties, Table II also indicates various physical and mechanical properties of the foams produced in Examples III-VIII and Runs C-1 and C-2 which properties were measured by subjecting the foam samples to the following standardized test procedures.

*Air Porosity*, which is a comparative measurement of the degree of openness of the cells of flexible foams, was determined in accordance with the following test procedure: The test specimen of foam (4 × 4 × ½ inches) is compressed between two pieces of flanged plastic tubing (2¼ inches I.D.) of an air porosity assembly maintained under an air pressure of 14.7 pounds. Air is drawn through the thickness (½ inch) of the foam speciment at a velocity controlled to maintain a differential pressure of 0.1 inch of water across the thickness dimension. The air flow necessary to develop the requisite pressure differential is recorded and the air flow per unit area of the foam specimen is reported as the air porosity of the foam.

*Density* was measured as described in Sections 68–73 of ASTM D 1564–64 T except that the test specimens has nominal dimensions of 4 × specimens × 1 inches.

*Tensile Strength* and *Ultimate Elongation* were measured in accordance with Sections 81–87 (Suffix T) of ASTM D 1564–64 T, after exposure of the foam epecimens to the above-described dry heat aging conditions, and are reported as the median values of three test specimens for each foam sample.

*Tear Resistance* was measured as described in Suffix G of ASTM D 1564–64 T and is reported as the median value of three test specimens for each foam sample.

*Compression Load Deflection* (CLD) which measures the load necessary to produce a 25 percent compression over the entire top area of the foam specimen, was determined in accordance with Syffix D of ASTM D 1564–64 T, both before and after exposure of the foam specimens to the above-described humid aging test conditions.

*Compression Set* at 90 percent constant deflection was determined in accordance with Sections 12–18 of ASTM D 1564–64 T, the amount of compression set ($C_t$) being expressed as a percent of the original specimen thickness and is reported as the median of three test specimens for each foam sample.

The results of Table II show that in each of Examples III–VIII, the tetrabromooctyl ether diol of the present invention provided self-extinguishing flexible foams which maintained their self-extinguishing characteristics after accelerated aging under very dry and humid conditions. Although the foams produced in comparative Runs C–1 and C–2 were also stable, self-extinguishing foams, they exhibited poorer breathability (as indicated by the low air porosity values) and a less desirable compression set than the self-extinguishing foams of the present invention.

EXAMPLES IX–XV

In accordance with these examples, another series of flexible polyurethane foams were prepared containing the tetrabromooctyl ether diol of the present invention

TABLE II

| Example No. (Run No.) | (K) | (C–1) | (C–2) | III | IV | V | VI | VII | VIII |
|---|---|---|---|---|---|---|---|---|---|
| Foam formulation A: | | | | | | | | | |
| Stannous octoate, pts. by wt | 0.275 | 0.20 | 0.15 | 0.20 | 0.20 | 0.20 | 0.20 | 0.20 | 0.20 |
| Diisocyanate, pts. by wt | 49.8 | 53.3 | 54.6 | 51.8 | 52.0 | 52.2 | 52.4 | 52.6 | 53.0 |
| Flame-retardant, pts. by wt.: | | | | | | | | | |
| 2,3-dihydroxypropyl 2,3,7,8-tetrabromooctyl ether | | | | 6.5 | 7.2 | 7.8 | 8.5 | 9.2 | 10.6 |
| Dibromoneopentyl glycol | | 5.0 | 7.0 | | | | | | |
| Weight percent Br in polymer [1] | 0 | 1.93 | 2.64 | 2.53 | 2.78 | 3.00 | 3.25 | 3.50 | 3.98 |
| Cream time, seconds | 7 | 7 | 7 | 7 | 7 | 7 | 7 | 7 | 7 |
| Rise time, seconds | 78 | 85 | 97 | 99 | 105 | 109 | 116 | 119 | 140 |
| Flammability by ASTM D-1692-67 T: | | | | | | | | | |
| Before sample conditioning: | | | | | | | | | |
| Rating | B | SE | SE | SE | SE | SE | SE | SE | SE |
| Burning extent, inches | | 3.2 | 3.1 | 2.8 | 2.8 | 2.4 | 3.4 | 2.6 | 2.5 |
| Extinguishing time, seconds | | 41 | 41 | 36 | 37 | 35 | 43 | 36 | 33 |
| Burning rate, inches/minute | 5.60 | 4.59 | 4.53 | 4.55 | 4.46 | 4.08 | 4.68 | 4.33 | 4.50 |
| After dry heat aging: | | | | | | | | | |
| Rating | | SE | SE | SE | SE | SE | SE | SE | SE |
| Burning extent, inches | | 3.0 | 2.6 | 3.4 | 2.8 | 1.9 | 2.7 | 2.7 | 1.8 |
| Extinguishing time, seconds | | 30 | 33 | 37 | 36 | 28 | 24 | 31 | 21 |
| Burning rate, inches/minute | | 5.93 | 4.82 | 5.47 | 4.66 | 3.91 | 6.79 | 5.11 | 5.11 |
| After humid aging: | | | | | | | | | |
| Rating | | SE | SE | SE | SE | SE | SE | SE | SE |
| Burning extent, inches | | 2.2 | 2.1 | 1.8 | 1.8 | 1.6 | 1.5 | 1.5 | 1.8 |
| Extinguishing time, seconds | | 26 | 27 | 23 | 22 | 21 | 20 | 21 | 22 |
| Burning rate, inches/minute | | 4.96 | 4.58 | 4.78 | 4.79 | 4.41 | 4.39 | 4.29 | 4.90 |
| Foam properties: | | | | | | | | | |
| Density, lbs./ft.$^3$ | | 1.49 | 1.50 | 1.59 | 1.61 | 1.64 | 1.59 | 1.66 | 1.63 |
| Air porosity, ft.$^3$/min./ft.$^2$ | | 32 | 40 | 90 | 59 | 51 | 90 | 87 | 92 |
| Tensile strength, p.s.i | | 19.2 | 20.0 | 14.8 | 17.3 | 14.7 | 14.8 | 15.7 | 17.8 |
| Elongation, percent | | 184 | 212 | 153 | 168 | 163 | 152 | 149 | 156 |
| Tear resistance, lbs./in | | 2.53 | 2.57 | 2.33 | 2.03 | 2.14 | 2.37 | 1.80 | 1.97 |
| 25% CLD, p.s.i | | 7.50 | 5.96 | 6.75 | 6.90 | 6.68 | 6.73 | 5.75 | 6.80 |
| 90% compression set, percent | | 8.8 | 9.0 | 5.0 | 5.3 | 4.9 | 5.6 | 6.7 | 6.2 |

[1] Total weight of polymer is taken as combined weight of polyether polyol, diisocyanate and flame-retardant.

TABLE III

| Example No. (Run No.) | (K–2) | (C–3) | (C–4) | IX | X | XI | XII | XIII | XIV | XV |
|---|---|---|---|---|---|---|---|---|---|---|
| Foam formulation A: | | | | | | | | | | |
| Stannous octoate, pts. by wt | 0.275 | 0.20 | 0.15 | 0.25 | 0.25 | 0.25 | 0.20 | 0.20 | 0.20 | 0.20 |
| Diisocyanate, pts. by wt | 49.8 | 53.3 | 54.6 | 50.5 | 51.0 | 51.3 | 51.8 | 52.2 | 52.6 | 53.3 |
| Flame-retardant, pts. by wt.: | | | | | | | | | | |
| 2,3-dihydroxypropyl 2,3,7,8-tetrabromooctyl ether | | | | 2.5 | 3.8 | 5.1 | 6.4 | 7.8 | 9.2 | 10.7 |
| Dibromoneopentyl glycol | | 5.0 | 7.0 | | | | | | | |
| Weight percent Br in polymer [1] | 0 | 1.93 | 2.64 | 1.00 | 1.51 | 2.01 | 2.49 | 3.00 | 3.50 | 4.02 |
| Cream time, seconds | 7 | 7 | 7 | 7 | 7 | 7 | 7 | 7 | 7 | 7 |
| Rise time, seconds | 76 | 85 | 96 | 80 | 80 | 80 | 92 | 94 | 92 | 93 |
| Flammability by oxygen index test: Oxygen index | 0.177 | 0.215 | 0.214 | 0.207 | 0.209 | 0.212 | 0.113 | 0.214 | 0.216 | 0.221 |
| Flammability by ASTM D-1692-67 T: | | | | | | | | | | |
| Before sample conditioning: | | | | | | | | | | |
| Rating | B | SE | SE | B | SE | SE | SE | SE | SE | SE |
| Burning extent, inches | | 2.3 | 1.9 | | 2.4 | 2.2 | 2.2 | 1.9 | 1.5 | 1.4 |
| Extinguishing time, seconds | | 29 | 26 | | 38 | 26 | 27 | 24 | 20 | 19 |
| Burning rate, inches/minute | 5.63 | 4.89 | 4.46 | 5.20 | 4.24 | 4.96 | 4.77 | 4.70 | 4.45 | 4.34 |
| After dry heat aging: | | | | | | | | | | |
| Rating | | SE | SE | | B | SE | [2] B | SE | SE | [3] B |
| Burning extent, inches | | 2.6 | 2.6 | | | 3.0 | | 3.0 | 2.7 | |
| Extinguishing time, seconds | | 32 | 30 | | | 33 | | 34 | 31 | |
| Burning rate, inches/minute | | 4.77 | 5.15 | | 5.00 | 5.34 | 5.26 | 5.33 | 5.06 | |
| After humid aging: | | | | | | | | | | |
| Rating | | SE | SE | | SE | SE | SE | SE | SE | SE |
| Burning extent, inches | | 3.1 | 2.9 | | 3.3 | 2.8 | 3.3 | 2.6 | 2.2 | 2.1 |
| Extinguishing time, seconds | | 37 | 36 | | 35 | 32 | 38 | 30 | 26 | 24 |
| Burning rate, inches/minute | | 5.02 | 4.89 | | 5.65 | 5.23 | 5.23 | 5.25 | 5.01 | 5.11 |
| Foam properties: | | | | | | | | | | |
| Density, lbs./ft.$^3$ | 1.56 | 1.67 | 1.67 | 1.58 | 1.57 | 1.58 | 1.63 | 1.63 | 1.64 | 1.65 |
| Air porosity, ft.$^3$/min./ft.$^2$ | 117 | 53 | 88 | 108 | 88 | 78 | 97 | 94 | 76 | 56 |
| Tensile strength, p.s.i | 14.2 | 17.9 | 17.9 | 13.8 | 12.4 | 13.1 | 12.7 | 13.0 | 12.8 | 12.8 |
| Elongation, percent | 158 | 190 | 195 | 156 | 142 | 138 | 142 | 142 | 136 | 137 |
| Tear resistance, lbs./in | 2.26 | 2.25 | 2.82 | 2.13 | 2.42 | 2.14 | 2.22 | 2.21 | 2.21 | 2.42 |
| 4-inch ILD, lbs./50 in.$^2$: | | | | | | | | | | |
| 25% deflection | 35 | 39 | 35 | 37 | 40 | 41 | 39 | 39 | 40 | 40 |
| 65% deflection | 64 | 72 | 69 | 68 | 74 | 76 | 73 | 73 | 75 | 76 |
| 25% return | 24 | 25 | 23 | 25 | 26 | 27 | 25 | 25 | 25 | 26 |
| Return value | 69 | 65 | 66 | 68 | 66 | 66 | 65 | 65 | 64 | 64 |
| Load ratio | 1.86 | 1.87 | 1.94 | 1.86 | 1.86 | 1.86 | 1.88 | 1.88 | 1.88 | 1.88 |
| 90% compression set, percent | 4.7 | 7.8 | 7.9 | 4.3 | 4.4 | 4.4 | 4.7 | 5.1 | 5.6 | 5.6 |

[1] Total weight of polymer is taken as combined weight of polyether polyol, diisocyanate and flame-retardant.
[2] Three of the five foam specimens tested were rated SE.
[3] Four of the five foam specimens tested were rated SE.

prepared as described in Example II above, in amounts sufficient to provide from 1 to 4 weight percent bromine in the polymer. Flexible foams were also prepared in which either no flame-retardant was used (Run No. K-2) or in which dibromoneopentyl glycol (Compound A) was employed as the flame-retardant (comparative Run Nos. C-3 and C-4). In each instance, Foam Formulation A of Table I above was used, the specific amounts of those components which were varied being given in the following Table III, following the procedure described above with reference to the foam preparations of Table II. The flammability and various physical and mechanical properties of the foamed products are as given in Table III which also includes the results of the following determinations.

*Flammability by Oxygen Index*, which indicates the quantity of oxygen necessary to just sustain combustion of the foam sample, was measured using the procedure standardized as ASTM D 2863 and General Electric's Oxygen Index Tester.

*Indentation Load Deflection* (ILD Values) to 25 percent and 65 percent deflections were measured in accordance with ASTM D 1564-64 T, Sections 19-25 (Method A), except that the dimensions of the foam specimens employed were 12 × 12 ' 4 inches. The Return Value is the percentage ratio of the load required to support the return 25 percent indentation after one minute as compared to the load required to support the initial 25 percent indentation after one minute. The Load Ratio is the ratio of the 65 percent and 25 percent ILD values, respectively.

In the following Table III, "B" indicates that on the basis of the results obtained in the aforementioned flammability test ASTM D 1692-67 T, at least one of the foam samples burned to such an extent that it did not qualify as a self-extinguishing material; therefore, the foam is given a burning ("B") rating.

The data of Table III indicate that the tetrabromooctyl ether diol of the present invention provides flame-retarded flexible polyurethane foams having a good overall combination of physical and mechanical properties, and that self-extinguishing characteristics are imparted when the ether diol is incorporated in an amount to provide a bromine content as low as 1.5 weight percent. Although dibromoneopentyl glycol employed as the flame-retardant in comparative Runs C-3 and C-4, also provides self-extinguishing foams, the presence thereof causes a substantial increase in the compression set of the foamed products. On the other hand, the compression set of the flexible foams of the present invention produced in Examples IX–XV is excellent being either essentially the same as or only slightly higher than the compression set of the control foam produced in Run K-2.

In addition to having the properties tabulated in Table II and Table III, the flame-retarded foams produced in Examples III–XV of the present invention (as well as the foams produced in comparative Runs C-1 to C-4) were essentially scorch-free. On the other hand, when flexible foams are prepared using the components of Foam Formulation A of Table I above and 2,3-dibromopropanol as the flame-retardant in amounts sufficient to provide bromine contents within the range employed in the foam preparations of Tables II and III, the flame-retarded foams exhibit substantial discloration due to scorching.

What is claimed is:

1. A flame-retarded flexible polyurethane foam having 2,3-dihydroxyprop-1-yl 2,3,7,8-tetrabromooct-1-yl ether incorporated therein in an amount sufficient to provide in said foam a bromine content of between about 0.5 and 20 weight percent.

2. A flame-retarded polyurethane foam produced by the method which comprises reacting and foaming a reaction mixture containing: (1) an organic polyisocyanate, (2) a polyether polyol, (3) a flame-retardant comprising 2,3-dihydroxyprop-1-yl 2,3,7,8-tetrabromooct-1-yl ether, (4) a blowing agent, and (5) a catalyst for the polyurethane-forming reaction, said flame-retardant being present in said reaction mixture in an amount sufficient to provide in said polyurethane product a bromine content of between about 1 and about 20 weight percent, based on the combined weight of (1), (2) and (3).

3. A polyurethane foam as defined in claim 2 in which the blowing agent is water.

4. A flame-retarded flexible polyurethane foam produced by the method which comprises reacting and foaming a reaction mixture containing: (1) a tolylene diisocyanate, (2) a polyether polyol having a hydroxyl number between about 32 and about 150, (3) a flame-retardant comprising 2,3-dihydroxyprop-1-yl 2,3,7,8-tetrabromooct-1-yl ether, (4) a blowing agent comprising water, (5) an amine catalyst for the polyurethane-forming reaction, and (6) a foam stabilizer, said flame-retardant being present in said reaction mixture in an amount sufficient to provide in said polyurethane product a bromine content of between about 1.5 and about 10 weight percent, based on the combined weight of (1), (2) and (3).

5. A flame-retarded flexible polyurethane foam as defined in claim 4 in which said reaction mixture additionally contains a tin carboxylate as a supplementary catalyst.

* * * * *

PO-1050
(5/69)

UNITED STATES PATENT OFFICE
CERTIFICATE OF CORRECTION

Patent No. 3,773,696        Dated November 20, 1973

Inventor(s) Anthony J. Papa et al.

It is certified that error appears in the above-identified patent and that said Letters Patent are hereby corrected as shown below:

Column 5, line 1, "cylcoalkyl-" should read -- cycloalkyl- --. Column 9, line 48, "-octadiene-1-yl" should read -- -octadien-1-yl --. Column 12, line 36, "156-64" should read -- 1564-64 --; line 55, "speciment" should read -- specimen --; line 63, "has" should read -- had --; line 63, "4 x specimens x 1" should read -- 4 x 4 x 1 --; line 66, "epeci-" should read -- speci- --. Column 13, line 9, "Syffix" should read -- Suffix --. Columns 13-14, Table II, opposite the legend reading "25% CLD, p.s.i." and under the column headed "(C-2)", "5.96" should read -- 6.96 --; Table III, opposite the legend reading "Flammability by oxygen index test: Oxygen index" and under the column headed "XII", "0.113" should read -- 0.213 --; Table III should be read immediately after line 37 of column 15. Column 15, line 25, "12 x 12' 4" should read -- 12 x 12 x 4 --.

Signed and sealed this 4th day of June 1974.

(SEAL)
Attest:

EDWARD M. FLETCHER, JR.
Attesting Officer

C. MARSHALL DANN
Commissioner of Patents